United States Patent
Piirainen (12)

(10) Patent No.: US 6,553,079 B1
(45) Date of Patent: Apr. 22, 2003

(54) DIGITAL MODULATOR FOR ANGLE AND/ OR AMPLITUDE MODULATION

(75) Inventor: Olli Juhani Piirainen, Oulu (FI)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 09/510,611

(22) Filed: Feb. 22, 2000

Related U.S. Application Data (63) Continuation of application No. PCT/EP97/04628, filed on Aug. 25, 1997.

(51) Int. Cl.[7] .............................. H03C 1/00; H03C 3/00; H03C 5/00; H03K 7/10
(52) U.S. Cl. .................... 375/269; 332/145; 332/151
(58) Field of Search ................................ 375/298, 295, 375/320, 300, 302, 308, 322, 261, 264, 268, 271, 269; 370/204; 332/144, 145, 149, 151, 103, 108, 119; 455/61, 102

(56) References Cited

U.S. PATENT DOCUMENTS

| | | | | |
|---|---|---|---|---|
| 3,497,625 A | | 2/1970 | Hileman et al. ............. 370/484 |
| 3,805,191 A | * | 4/1974 | Kawai et al. ................ 332/9 R |
| 3,958,191 A | | 5/1976 | Jones, Jr. ........................ 332/1 |
| 4,584,541 A | * | 4/1986 | Nossen ...................... 332/16 R |
| 4,746,880 A | | 5/1988 | McCune, Jr. .............. 332/16 R |
| 4,812,786 A | | 3/1989 | Davarian et al. .......... 332/16 R |
| 4,910,474 A | * | 3/1990 | Tjahjadi et al. .............. 332/103 |
| 5,321,799 A | | 6/1994 | McCune, Jr. ................ 395/140 |
| 5,329,260 A | * | 7/1994 | Poplin ........................ 332/119 |
| 5,602,868 A | * | 2/1997 | Wilson ........................ 375/219 |
| 5,705,959 A | * | 1/1998 | O'Loughlin ................. 332/151 |
| 5,945,885 A | * | 8/1999 | Schwartz et al. ............ 332/100 |
| 6,101,224 A | * | 8/2000 | Lindoff et al. .............. 375/300 |

OTHER PUBLICATIONS

1992, "The GSM System for Mobile Communications" Mouly, et al.
"A digitally implemented modem: Theory and emulation results" Poklemba, et al. Comsat Technical Review, vol. 22, No. 1. Jan. 1992.
"A 200MHz Quadrature Digital Synthesizer/Mixer in 0.8$\mu$m CMOS" Tan, et al. IEEE May 1, 1994, pp. 59–62.
1991, "Elements of Digital Communications" Duponteil, et al. Wiley & Songs, Chichester, Great Britain, XP002063226, p. 46, paragraph 2.3.2.

* cited by examiner

*Primary Examiner*—Chi Pham
*Assistant Examiner*—Dung X. Nguyen
(74) *Attorney, Agent, or Firm*—Squire Sanders & Dempsey LLP (57) ABSTRACT

The modulator has an input (30) which receives data to be modulated. A plurality of memory regions acting as look-up tables (38–44) are arranged to contain information relating to the modulation method to be carried out by the modulator. At least one of the memory regions provides time independent modulation values and at least one of the memory regions provides time dependent modulation values. Values provided by the memory region is dependent on the data received via the input. Processing means provide a modulating signal based on the values provided by the memory regions.

27 Claims, 3 Drawing Sheets

DIGITAL MODULATOR FOR ANGLE AND/OR AMPLITUDE MODULATION

This application is a Continuation of Application No. PCT/EP97/04628, filed Aug. 25, 1997.

The present invention relates to a modulator and a modulation method for use, in particular but not exclusively, in cellular telecommunication networks.

In the various known cellular telecommunication networks, modulation is required in order to transmit data in the frequency band which has been allocated to the base station or mobile station in the particular cellular network. The frequencies which are typically used in cellular telecommunication networks for communication between base stations and mobile stations are relatively high frequencies which are much greater than those frequencies with which current digital technology can deal. Accordingly, digital circuitry of a cellular telecommunication network will use a base band frequency, which is much lower than the frequency used to transmit data between, for example base stations and mobile stations. After processing by the base station or mobile station, the data will be modulated onto the carrier frequency to be used.

A large number of different modulation methods are known but these modulation methods can be generally divided up into three categories. The first category uses amplitude modulation, the second category uses phase modulation whilst the third uses frequency modulation. Modulation methods which use a combination of these three known categories are known. For example quadrature amplitude modulation is a combination of amplitude and phase modulation. In the GSM standard for wireless communication, Gaussian Minimum Shift Keying (GMSK) is used which is a form of frequency modulation. However, the modulators which are currently used are generally only able to support a single modulation method. In other words, each modulator is specifically designed for a single modulation method. Thus, for every different type of modulation method used in cellular telecommunication networks, a separate modulator needs to be provided. This is disadvantageous in that a number of different modulators may need to be stocked by a manufacturer of mobile and base stations. Another problem is that it is also difficult to modify existing base and mobile stations to introduce new modulation methods. This may increase the time required in order to introduce new standards or alternatively may deter network operators from changing the modulation method used even if the new modulation method is more efficient. Additionally, during the design of new cellular network standards, it is often uncertain as to what modulation method will ultimately be used. This can increase the length of time required in order to get equipment such as base transceiver stations and mobile stations incorporating the required modulator onto the market.

According to one aspect of the present invention, there is provided a modulator for modulating input data, said modulator comprising an input for receiving data to be modulated; a plurality of memory regions arranged to contain information relating to a modulation method to be carried out by said modulator, at least one of said memory regions providing time independent modulation values and at least one of said memory regions providing time dependent modulation values, the values provided by said memory regions being dependent on the data received via said input; and processing means for providing a modulating signal based on the values provided by said memory regions.

It should be appreciated, that the above defined modulator incorporates a new manner of achieving modulation, that is having a plurality of memory regions, at least one of which provides time independent values and at least one of which provides a time dependent modulation value. This may be advantageous in achieving modulation relatively simply for otherwise quite complex modulation methods.

According to a second aspect of the present invention, there is provided a modulator for modulating input data, said modulator comprising an input for receiving data to be modulated; a plurality of memory regions arranged to contain information relating to a modulation method to be carried out by said modulator, at least one of said memory regions providing amplitude modulation values and at least one of the memory regions providing phase modulation values, the values provided by said memory regions being dependent on the data received via said input; and processing means for providing a modulation signal based on the values provided by said memory region.

In this modulator, the memory regions provide phase modulation and amplitude modulation values. Again this allows quite complex modulation methods to be implemented quite simply.

Preferably, the memory regions comprise a memory region arranged to provide time independent phase modulation values and a memory region arranged to provide time dependent phase modulation values. It should be appreciated that with this modulator, it is possible to support virtually all modulation methods which employ phase and frequency.

Preferably, the memory regions comprise a memory region arranged to provide time dependent amplitude modulation values and a memory region arranged to provide time independent amplitude modulation values. Again, these two memory regions allow any type of amplitude modulation to be supported.

In the second aspect of the invention, preferably said at least one of said memory regions providing amplitude modulation values provide at least one of the following values: time independent amplitude modulation values and time dependent amplitude modulation values. Preferably, said at least one of said memory regions providing phase modulation values provide at least one of the following values: time independent phase modulation values and time dependent phase modulation values. A separate memory region is preferably provided for each of the different types of modulation values provided.

The modulator may be arranged to be capable of supporting a plurality of different modulation methods, said memory regions being arranged to contain information relating to the selected modulation method. In this way, the modulator can support a number of different modulation methods and the same modulator can be used in different situations.

The memory regions may be arranged to store values relating to a selected modulation method whereby each memory region provides a look-up table. Alternatively, the memory regions may be arranged to store respective programs from which the values are generated. In this latter situation, a processor may be provided in order to generate the required values from the stored programs or algorithms.

Data control means may be provided, said data control means being arranged to control to which of the memory regions at input data is applied. It should be appreciated that all input data can be applied to all of the memory regions. Alternatively, only some of the input data may be applied to a given memory region. This will depend on the modulation method selected.

Preferably, register means are provided for the memory regions, said register means being arranged to store a predetermined amount of input data. Separate register means may be provided for each of the memory regions. Alternatively at least some of the memory regions may share common register means. Preferably, each value provided by said memory regions is dependent on at least some of the predetermined amount of said input data. By storing the input data in register means, it is possible to take into account the past history of a signal. This is required with some forms of modulation, for example GMSK. The input data may take the form of a series of bits and the register means may be arranged to store a predetermined number of those bits. Those predetermined number of bits of data can be applied, at the same time, to a given memory region in order to obtain the desired output value from the memory region in question.

Means may be provided for combining the outputs from the plurality of the memory regions. These combining means comprise adding means and/or multiplying means, as required by the particular modulation method employed.

A carrier frequency may be combined with the output from one of the memory regions. It should be appreciated that this carrier frequency may be different from that which is used to transmit a signal in a cellular telecommunications network. In particular, the carrier frequency may be much smaller than that used to transmit a signal through an air interface in a cellular telecommunication network.

The output of the or each of the memory regions providing time dependent modulation values may be coupled to respective integrator means. This effectively provides a average for the values over a given period of time. Preferably, the or each memory region arranged to provide time dependent modulation values is arranged to receive a counter signal. This enables a smoother modulation signal to be achieved in that intermediate values can be calculated.

A controller may be provided which provides the information in the memory regions in accordance with the selected modulation method. The amount of input data stored in said register means may be set by a controller. A controller may be arranged to provide information to the data control means indicating to which of the memory regions said input data is to be applied. The provision of a controller which is able to carry out one or more of the above described functions enables the modulator to support a number of different modulation methods including those which require a past history of the input data to be taken into account as well as those which do not. Additionally, the splitting of the data to be applied to the various memory regions can also be controlled in dependence with the selected modulation method. The actual information contained in the memory regions can again be altered as required. The controller may have an external input for providing information relating to the selected modulation method.

Preferably, the outputs of the memory regions providing the time independent and time dependent modulation values are connected to a direct digital synthesiser (DDS) which sums together the outputs of the memory regions. This is particularly advantageous when the DDS is coupled to the memory regions providing phase modulation values. However, the direct digital synthesiser may additionally or alternatively be connected to the or each memory region providing amplitude modulation values. The direct digital synthesiser may receive one input from a memory region providing phase modulation values and one input from a memory region providing amplitude modulation values.

In one preferred embodiment of the present invention, the memory regions comprise four memory regions, one of which provides time independent phase modulation values, the second of which provides time dependent phase modulation values, a third of which provides time dependent amplitude modulation values and the fourth of which provides time independent amplitude modulation values. With these four memory regions, it is possible to provide any known modulation method.

Preferably, the output of the modulator is defined by the following equation:

$$(\int A'(t, \text{data\_amp})dt + A_o(\text{data\_amp}))\cos(\omega_c t + \int \Phi'(t, \text{data\_ph})dt + \Phi_o(\text{data\_ph})) \quad (1)$$

where:
- $A'(t, \text{data\_amp})$ is the output of the memory region providing time dependent amplitude modulation values,
- $A_o(\text{data\_amp})$ is the output of the memory region providing time independent amplitude modulation values,
- $\Phi'(t, \text{data\_ph})$ is the output of the memory region providing time dependent phase modulation values,
- $\Phi_o(\text{data\_ph})$ is the output of the memory region providing time independent phase modulation values, and
- $\omega_c$ is the frequency used to carry the modulation signal.

With this particular equation, it is possible to define any known modulation method and this allows any modulation method to be relatively simply and cheaply implemented.

The modulator may be provided with a plurality of memory regions, wherein in dependence on the selected modulation method, only some of those plurality of memory regions are used. Thus, the number of memory regions used can be selected in accordance with the selected modulation method. The information for the selected modulation method may be provided from an external source to the respective memory region.

Embodiments of the present invention can be incorporated in a station of a cellular telecommunication network. The station may of course be a base station or a mobile telecommunication network.

According to a third aspect of the present invention, there is provided a method of modulating input data comprising the steps of receiving input data to be modulated; providing a plurality of memory regions arranged to contain time independent modulation information and time dependent modulation information; outputting time dependent and time independent modulation values from said respective memory regions in dependence on the received input data; and processing said time dependent modulation values and said time independent modulation values to provide a modulation signal.

According to a fourth aspect of the present invention, there is provided a method of modulating input data comprising the steps of receiving input data to be modulated; providing a plurality of memory regions arranged to contain phase modulation information and amplitude phase modulation information; outputting phase modulation and amplitude modulation values from tsaid respective memory regions in dependence on the received input data; and processing said phase modulation values and said amplitude modulation values to provide a modulation signal.

For a better understanding of the present invention and as to how the same may be carried into effect, reference will now be made by way of example to the accompanying drawings in which.

Figure 1:
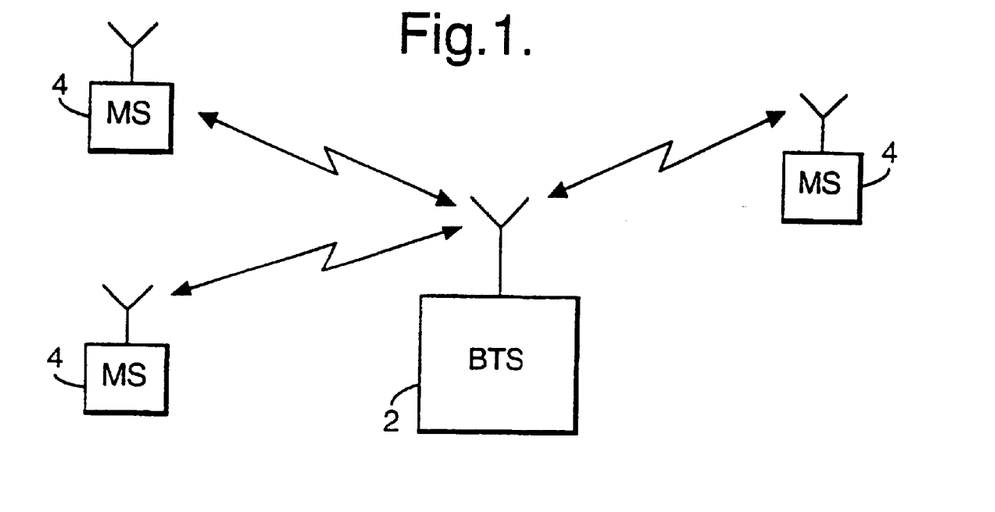
FIG. 1 shows schematically part of a cellular telecommunications network in which the present invention can be used.

FIG. 1 shows part of a cellular telecommunications network in which the modulator embodying the present invention can be incorporated. Cellular telecommunication networks typically comprise a network of base stations 2, one of which is shown in FIG. 1. Each base station 2 is arranged to transmit signals to and receive signals from mobile stations 4. Likewise, each mobile station 4 is arranged to transmit signals to and receive signals from the base station 2 of the cell in which a given mobile station 4 is located. The signals which are transmitted between the base station 2 and the mobile stations 4 are on the appropriate carrier frequencies. The carrier frequencies used will depend on the particular cellular telecommunication network and its associated frequency. For example, in GSM networks, a range of carrier frequencies of around 900 MHz are used. Other communication networks such as DCS 1800 networks use carrier frequencies of around 1800 MHz. As will be discussed in more detail hereinafter, the data which is to be transmitted between the base station and the mobile station is modulated onto the carrier wave.

For the purposes of this document, the term data includes encoded speech data, video data, data per se, control data, reference data and the like. The term data should be broadly construed to include all kinds of information including all types of binary information.

Figure 2:
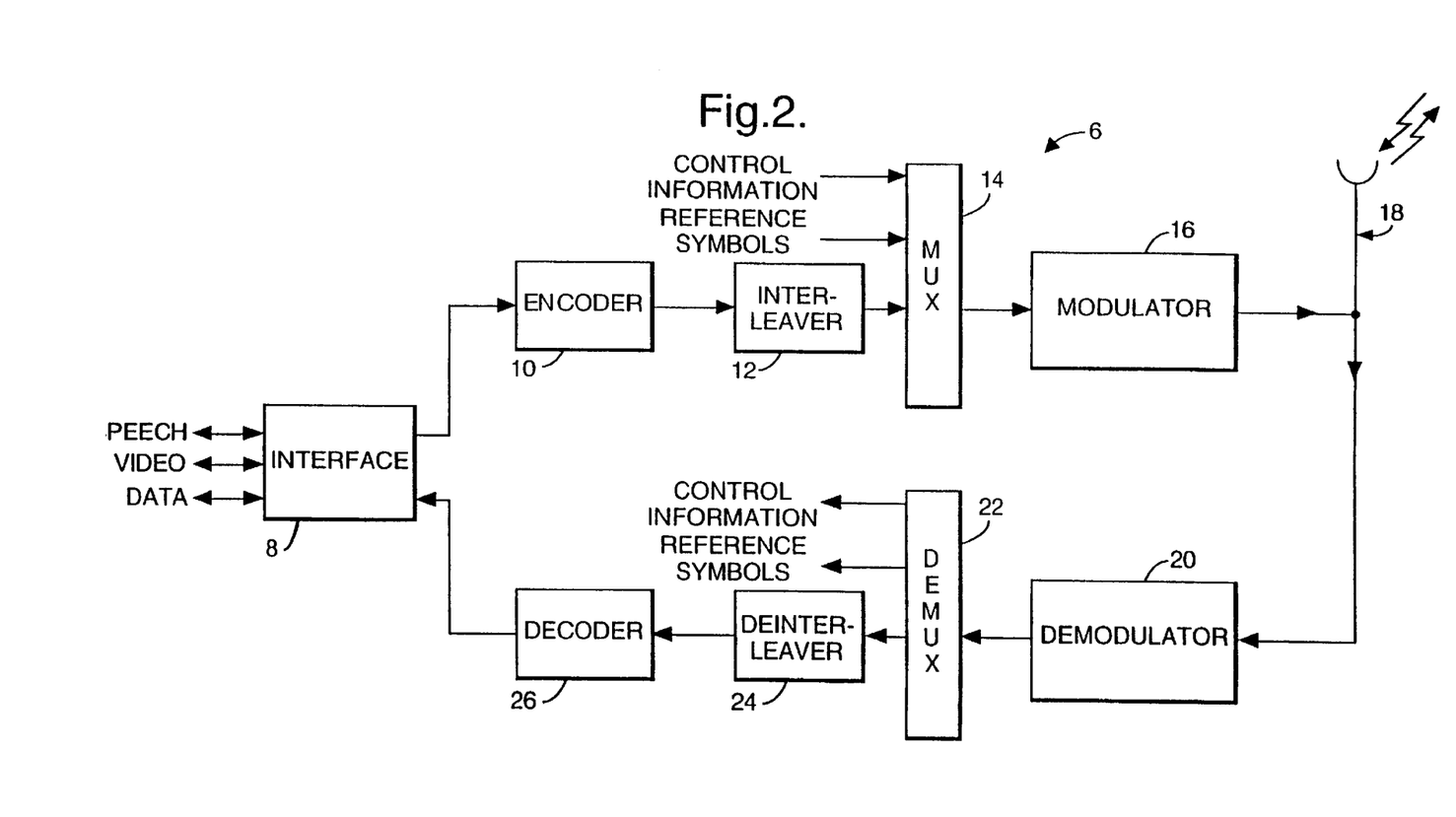
FIG. 2 is a block diagram of circuitry typically found in base stations and mobile stations.

Reference will now be made to FIG. 2 which shows schematically typical circuitry 6 which is found both in base stations 2 and mobile stations 4. The circuitry 6 comprises an interface 8 which is able to receive data, such as speech data, video data or data per se. The data which is received by the interface 8 is passed to an encoder 10 where the data is encoded. The encoded data 10 is then passed to an interleaver 12 which interleaves the data. Interleaving is carried out in order to minimise the problems caused by error bursts in a transmission channel between a mobile station and a base station. The output of the interleaver 12 is connected to a multiplexer 14 which also has inputs which receive reference symbols and control information. The output of the multiplexer 14 represents one of the three inputs of the multiplexer 14. The data, symbols or information output by the multiplexer 14 is passed to a modulator 16 which generates a modulation signal based on that data, information or symbols which it receives. The modulation signal is used to modulate a carrier wave. The modulated carrier wave is then transmitted across the channel using an antenna 18. The modulator 16 will be described in more detail hereinafter. It should be appreciated that a given data burst may include one or more of the data, reference symbols and control information.

The antenna 18 also is arranged to receive signals. The received signals are passed to a demodulator 20 which removes the carrier wave to provide the modulating signal. The modulating signal is then demodulated by the demodulator 20 to provide a signal comprising the data, information or symbols which have been transmitted from a base station 2 or mobile station 4. As mentioned previously, the circuitry 6 of FIG. 2 is only a schematic representation of the circuitry which is present in base stations and mobile stations. Generally the demodulator 20 of actual mobile stations or base stations is more complex and may, for example, be arranged also to perform an equalizing function. Nevertheless, in general the operations carried out by the demodulator 16 will remove the effects of the modulation introduced by the modulator of the station from which the signal has been received.

A demultiplexer 22 is coupled to the demodulator and has three outputs, one for the data, one for the reference symbols and one for the control information. The data is then passed from the demultiplexer 22 to a de-interleaver 24 which reverses the interleaving operation carried out by the interleaver 12 of the station from which the signal has been received. The de-interleaved data is then passed to a decoder 26 which decodes the data which has been transmitted across the channel. The decoded data is passed to the interface 8 which outputs the data, which may be speech data, video data, data per se or the like. It should be appreciated that the circuitry shown in FIG. 2 is only a schematic representation of part of a base station 2 or a mobile station 4. It should also be appreciated that the circuitry actually provided in the base stations 2 and mobile stations 4 may not be identical to that shown in FIG. 2 but will generally carry out the functions described in relation to this figure. The actual circuitry provided in the base stations 2 may well differ from that provided in the mobile stations 4. Nevertheless similar functions will be carried out in the mobile and base stations.

Figure 3:
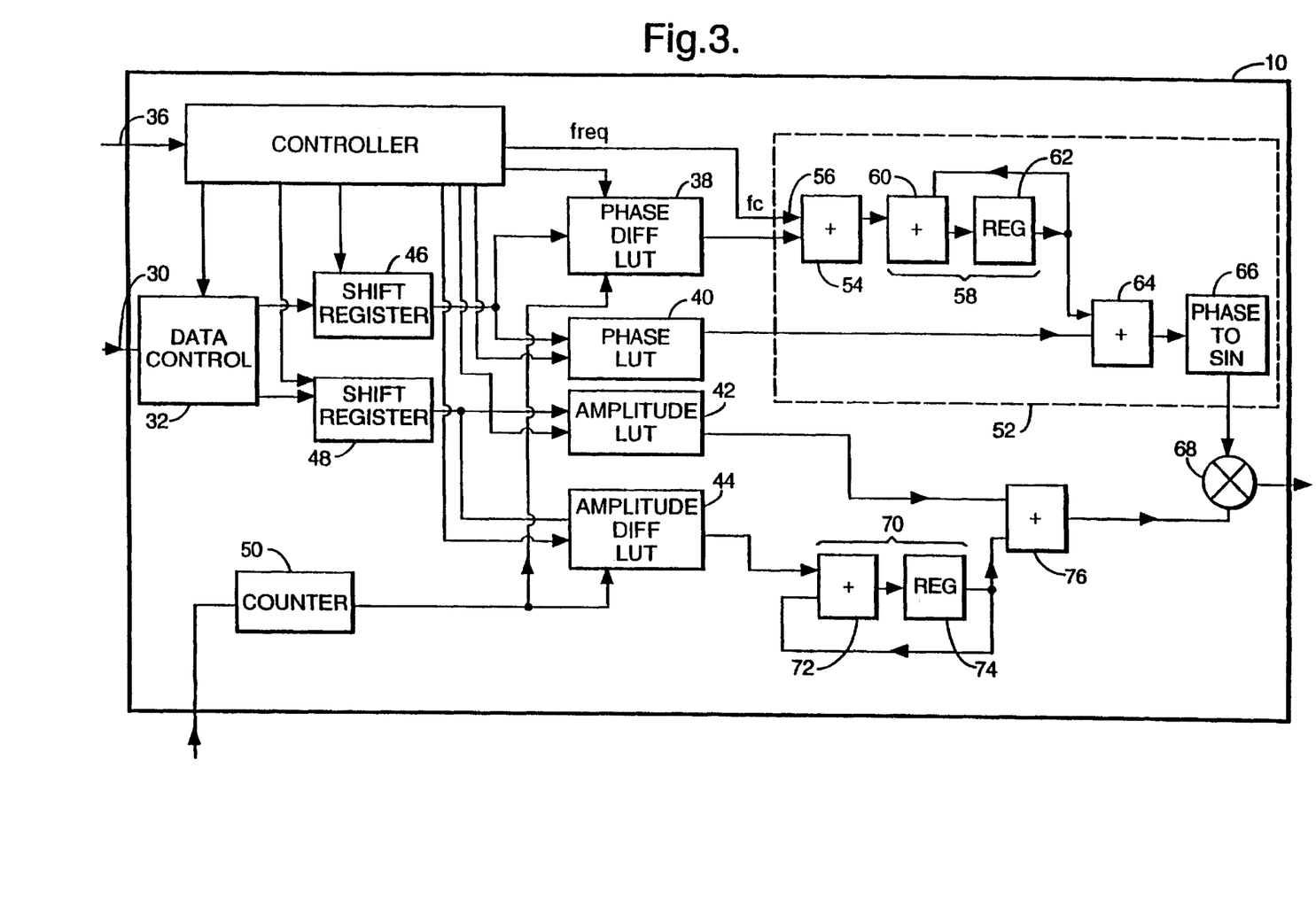
FIG. 3 shows a block diagram of a modulator embodying the present invention.

Reference will now be made to FIG. 3 which shows a modulator 16 embodying the present invention. Before describing the modulator 16 in any detail, the principal behind the embodiments of the present invention will now be described. In general, modulation $S(t,data)$ can be defined as follows:

$$S(t,\text{data}) = A(t,\text{data\_amp}) \cos(\omega_c t + \Phi(t,\text{data\_ph}))$$

where A(t,data_amp) is the amplitude modulation part and Φ(t,data_ph) is the phase modulation part. It should be appreciated that Φ(t,data_ph) in fact is capable of representing both phase modulation and frequency modulation although for convenience Φ(t,data_ph) will be referred to as the "phase modulation part" in this document. The modulating data can be divided into two parts, data_amp for controlling the amplitude modulation part and data_ph for controlling the phase modulation part. The above equation can be rewritten as follows:

$$(\int A'(t,\text{data\_amp})dt + A_o(\text{data\_amp}))\cos(\omega_c t + \int \Phi'(t,\text{data\_ph})dt + \Phi_o(\text{data\_ph})) \qquad (1)$$

where A'(t,data_amp) and Φ'(t,data_ph) are the time derivative terms of the amplitude and phase modulation parts respectively and $A_o$(data_amp) and $\Phi_o$(data_ph) are the amplitude and phase integration constant terms respectively.

It should be appreciated that all of the different types of modulation can be defined by equation 1. With some forms of modulation, only one of the four terms contributes to the resulting modulation. The other three terms will not effect the modulation. Other forms of modulation will be defined by varying values of all four of the terms. Of course it is also possible that some forms of modulation may be defined by two of the four terms or three of the four terms. Some forms of modulation only have phase components and as such the amplitude modulation components will have no effect. If the modulation is a phase modulation such as phase shift keying (PSK) modulation then the only part of the equation which has any effect is the time independent element of the phase modulation part, that is Φ(data_ph). On the other hand if the modulation is a frequency shift keying (FSK) modulation, then the only part of the equation which has any effect is the time dependent element of the phase modulation part, that is ∫Φ'(t,data_ph)dt. Alternatively, with modulation methods which only have amplitude modulation components, there will be no contribution from the phase components.

In general terms, embodiments of the present invention provide a look-up table 38–44 for each of the four separate terms of equation 1. The look-up tables are programmable so that they can receive the necessary data in dependence upon the selected modulation method. However, this will now be described in more detail in relation to FIG. 3 which shows a modulator embodying the present invention.

Data etc from the multiplexer 14 is received on input 30 to the modulator 16. This data is input to a data control block 32. The data control block 32 is controlled by a controller 34. The controller 34 is arranged to ensure that the modulator 16 operates in accordance with the selected modulation method. The controller 34 therefore has an input 36 from an external source which provides the necessary data to control which modulation method is performed by the modulator 16. This includes controlling the information stored in each of the look-up tables 38 to 44. It should be appreciated that information stored in the look-up tables 38 to 44 again depends on the particular modulation method to be used by the modulator 16.

The data control block 32 is arranged to determine how the data should flow through the modulator 16. In particular, the data control block 32 is connected to two shift registers 46 and 48. The first shift register 46 is connected to the phase component look-up tables 38 and 40 whilst the second shift register 48 is connected to the amplitude component look-up tables 42 and 44. The data control block 32, which is controlled by the controller 34 in dependence on the selected modulation method, controls the flow of data to the shift registers. With some modulation methods, all of the data will be passed to both of the shift registers 46 and 48. However, in alternative modulation methods, half of the data could be passed to the first shift register 46 whilst the other half of the data could be passed to the second shift register 48. In a still further modulation method, data could only be passed to one of the shift registers 46 or 48. For example, if a form of modulation was used which had no amplitude modulation components, then the data could just be passed to the first shift register 46 which is connected to the phase component look-up tables 38 and 40. Similarly, if a form of modulation was used which only had amplitude components, then all the data could be passed only to the second shift register 48.

Thus, the data from the data control block 32 is passed to one, other or both of the two shift registers 46 and 48 which are, depending on the modulation method being used, arranged to store a plurality of bits. The number of bits which are required to be stored, if any, will depend on the selected modulation method. A number of bits will need to be stored if the modulation method used takes into account the previous history of the received signal. For example, in Gaussian Minimum Shift Keying (GMSK) modulation, the data is assumed to pass through a Gaussian filter prior to its modulation. However, the Gaussian filter is unable to provide any meaningful results for a single bit of data. Rather, a series of values are required in order to get the necessary response from the Gaussian filter. Therefore, several of the preceding bits of data will need to be stored in the appropriate shift register, which is the first shift register 46 in order to provide this filter function. In embodiments of the present invention, the action of the Gaussian filter will be approximated by the look-up tables 38. GMSK does not use any amplitude components. Embodiments of the present invention can of course be modified to simulate the action of filters other than Gaussian filters.

It should be appreciated that in some embodiments of the present invention, no previous history is required, in which case the shift registers 46 and 48 would not store more than one or two values or bits at a time. Different numbers of bits or values may need to be stored in the shift registers 46 and 48 depending on the modulation method. Accordingly, the shift register 46 and 48 may be configurable by the controller 34 in order to store the correct number of bits or values for the selected modulation method. Each of the shift registers 46 and 48 are arranged to act as a first-in-first-out FIFO register. The shift registers 46 and 48 can of course be replaced by any other suitable components which are able to provide the same or a similar function. For example the shift registers could be replaced by suitably controlled RAMs which mimic the function of a shift register. The shift registers 46 and 48 can be regarded as storing several symbols or several bits. It should be pointed out that a symbol may contain one or more bits. In these circumstances, the shift registers can be arranged to receive all of the bits defining a symbol at one time or serially.

The information stored in the shift registers 46 and 48 define addresses in the corresponding look-up tables 38 to 44. The values in the respective look-up tables are dependent on the modulation method which the modulator 16 is to perform. In particular, the controller 34 is arranged to provide the necessary values for the look-up tables. In general, these values will be put into the look-up tables 38 to 44 when the modulator 16 is first configured. The values for the look-up tables 38 to 44 may come from an external source via the external input 36 of the controller 34.

The first look-up table 38 is the phase differential look-up table and corresponds to the time derivative term of the phase modulation part of equation 1. This term is a time dependent term. The second look-up table, the phase look-up table 40 corresponds to the phase integration constant term of equation 1. This term is a time independent term. The third look-up table, the amplitude look-up table 42 corresponds to the amplitude integration constant term of equation 1. This term is time independent. The fourth look-up table, the amplitude differential table 44, corresponds to the time derivative term of the amplitude modulation part of equation 1. This term is time dependent. The phase differential look-up table 38 and the amplitude differential look-up table 44 are time derivative look-up tables and are therefore arranged to receive a counter input from a counter 50. The phase look-up table 40 and amplitude look-up table 42 are constant tables and thus do not require an input from the counter 50 as they are independent of time. As mentioned previously, the data stored in the shift registers 46 and 48 act as addresses for the respective look-up tables 38 to 44. Thus, the address stored in the first shift register 46 causes data corresponding to that address to be output from the phase differential look-up table 30 and/or the phase look-up table 40. Likewise, the data stored in the shift register 48 defines addresses for the amplitude look-up table 42 and/or the amplitude differential look-up table 44. The data corresponding to the respective addresses is output, depending on the modulation method, from one or more of the look-up tables 38 to 44.

The counter 50 is required for the time derivative look-up tables, that is the phase differential look-up table 38 and the amplitude differential look-up table 44. The counter 50 counts the oversampling ratio of the signal output by the differential look-up tables 38 and 44 to the signal input to those same look-up tables 38 and 44.

Figure 4:
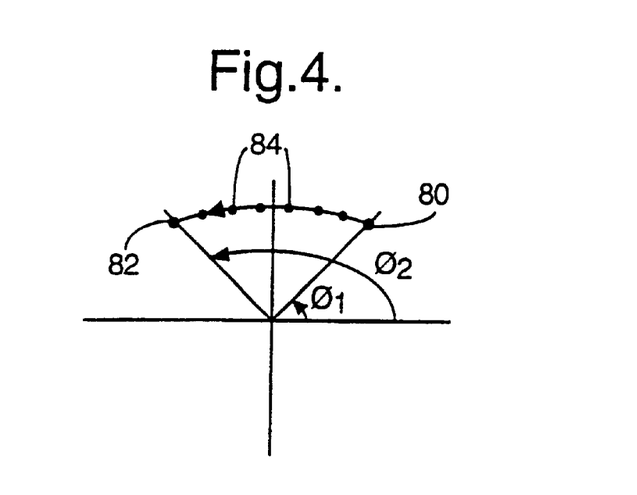
FIG. 4 is a phase diagram to explain the purpose of the counter of FIG. 3.

The purpose of the counter 50 can best be explained in relation to FIG. 4 which shows a phase diagram. Point 80 represents the phase modulation value for the first bit of data received from the data control block 32. Point 82 represents the phase value for the next bit of data received from the data control block 32. The counter 50 effectively allows the value of points 84 between the first and second points 80 and 82 to be determined to give rise to a smoother modulating signal. Values corresponding to points 80 and 82 as well as the intermediate points 84 are output from the phase differential look-up table 38. Thus, for each bit of data received by the data control block 32, the phase differential look-up table 38 will provide a plurality of successive values. The number of values will depend on the counter 50 and may be for example 200. Each time the output of the counter 50 is increased by one, a value is output by the phase differential look-up table 38. Whilst the effect of the counter 50 has been described in relation to the phase differential look-up table 38, it should be appreciated that the counter 50 has a similar effect on the amplitude differential look-up table 44.

The output of the phase differential look-up table 38 and the output of the phase look-up table 40 are input to a direct digital synthesiser (DDS) 52. In particular, the output of the phase differential look-up table 38 is input to a first adder 54 of the DDS 52 which also receives an input 56 from the controller 34. The input provided by the controller 34 provides an intermediate frequency fc which is very much less than the carrier frequency which is ultimately used to transmit the data across the air interface. The output of the adder 54 which provides a signal comprising fc plus the value received from the phase differential look-up table is input to an integrator 58 defined by a second adder 60 and a register 62. The output of the second adder 60 is connected to the register 62 which in turn has an output connected to the input of the second adder 60. The output of the integrator 58 which is provided on the output of the register 62 has the following component of equation 1:

$$\omega_c t + \int \Phi'(t, \text{data\_ph}) dt$$

The integrator 58 operates in a conventional manner. The first value, fc plus the first output of the phase differential look-up table 38 (mod1) i.e. fc+mod1 is input to the adder 60. However, as the register 62 is empty at this point, the output of the adder 60 will be fc+mod1. This value is stored in the register 62 and is also output from the integrator 58. The next value to be output by the phase differential look-up table is mod2. The output of the first adder 54 will then be mod2+fc. This is input to the integrator 58. As the register 62 has stored the value, fc+mod1, this will be added by the second adder 60 of the integrator 58 to the value received from the first adder 54 giving a value of mod1+mod2+2fc. This value is now stored in the register 62 and also output from the integrator 58. This continues for each of the values output by the phase differential look-up table 38. The summing of the values output by the phase differential look-up table effectively provides the $\int \Phi'(t, \text{data\_ph}) dt$ value of equation 1. The register 62 is only able to hold a limited number of bits. When the cumulative total exceeds the available number of bits, the most significant bits only will be stored in the register 62.

The output of the integrator 58 is connected to a third adder 64 which also receives an input from the phase look-up table 40. The output of the phase look-up table 40 is thus added to the output of the integrator 58 and the output of the third adder 64 can be regarded as providing the following terms from equation 1:

$$\omega_c t + \int \Phi'(t, \text{data\_ph}) dt + \Phi_o(\text{data\_ph})$$

The output of the third adder 64 is input to a memory 66 where the value received from the adder 64 is effectively applied to a sinusoidal wave. This readily gives rise to the following term of equation 1:

$$\cos(\omega_c t + \int \Phi'(t, \text{data\_ph}) dt + \Phi_o(\text{data\_ph}))$$

The output of the memory 66 is input to a multiplier 68.

The output of the amplitude differential look-up table 64 is input to a second integrator 70 which comprises a fourth adder 72 and a second register 74. The output of the fourth adder 72 is input to the second register 74. The output of the second register 74 is also connected to the input of the fourth adder 72. The integrator 70 carries out a similar function to that carried out by the integrator 58 of the direct digital synthesiser DDS 52. Thus, the first output of the amplitude differential look-up table 44 amp 1 is passed through the fourth adder 72. As there is no value in the second register 74, the value amp 1 is stored in the register 74 and also output to a further adder 76. When a second value amp 2 is received from the amplitude differential look-up table, this is passed to the fourth adder 72. The value stored in the second register 74, which in this case is amp 1 is also input to the fourth adder 72 so that the output of the fourth adder 72 is amp 1+amp 2. This new value is stored in the register 74 and also output to the further adder 76. Thus, the output of the integrator 70 provides the following term of equation 1:

$$\int A'(t, \text{data\_amp}) dt$$

This process continues for each successive value output by the amplitude differential look-up table. As with the register of the integrator 58 of the direct digital synthesiser 52, the register has a finite number of bits. When the total of the sum performed by the adder 72 exceeds the number of bits of the register 74, the register 74 will only store the most significant bits.

The output of the amplitude look-up table 42 is also input to the further adder 76. The output of the amplitude look-up table represents the following term of equation 1:

$$A_o(\text{data\_amp})$$

The output of the amplitude look-up table 42 and the output of the integrator 70 are added together by the further adder 76 and provide the following term of equation 1:

$$\int A'(t, \text{data\_amp}) dt + A_o(\text{data\_amp})$$

The output of the further adder 76 is input to the multiplier 68. The multiplier 68 multiplies the output received from the direct digital synthesiser 52 with the output of the adder 76 to provide S(t,data) as defined by equation 1.

As mentioned hereinbefore, the frequency of the output of the modulator 16 is very much less than that of the carrier frequency and, for example may be 20 MHz. In GSM, the typical carrier frequencies will be around 900 MHz. The output of the modulator 16 will in fact pass to a digital to analogue converter and will be subsequently added to the carrier wave of the right frequency to provide the signal which is output to the channel via the antenna 18.

Using the arrangement shown in FIG. 3, it is possible to carry out virtually any modulation method. It should be appreciated that with certain modulation methods only one of the look-up tables would in fact be required. For example, minimum shift keying methods such as Gaussian Minimum Shift Keying, only the phase differential look-up table 38 needs to be used. Accordingly, the controller 34 would ensure that the second shift register 48 was disabled along with the phase look-up table 40, the amplitude look-up table 42 and the amplitude differential look-up table 44. In contrast, phase shift keying methods may only require the phase look-up table 40. Accordingly, the controller 34 would disable the second shift register 48 as well as the phase differential look-up table 38, the amplitude look-up table 42 and the amplitude differential look-up table 44. Likewise, for amplitude modulation methods, the first shift register 46, the phase differential look-up table 38 and the phase look-up table 40 would be disabled by the controller 34. One of the amplitude look-up table and the amplitude differential look-up table may be disabled, but in some embodiments, both of these tables may be enabled by the controller 34. In QAM (quadrature amplitude modulation) all four of the look-up tables 38–44 could be enabled along with both of the shift registers 46 and 48. This is because the QAM (quadrature amplitude modulation) includes phase components and amplitude components. It is possible for certain types of QAM to use only one phase look-up table and only one amplitude look-up table.

As all forms of modulation can be defined by equation 1, it is possible to adapt the modulator shown in FIG. 3 to carry out any of the possible modulation methods using one or more of the four look-up tables 38–44. As previously mentioned, the contents of the look-up tables 38 to 44 will depend on the modulation method selected and can be input via the controller 34 using the external input 36. Thus, the configuration of the modulator 16 can be easily changed using an external input 36. It is also possible using this modulator for a single system to support more than one modulation method. In this regard, the configuration of the shift registers and look-up tables could be changed between time slots under the control of the controller 34.

Embodiments of the present invention have application to any type of communication systems and the two stations in question need not be base and mobile stations. For example, the two stations could both be fixed. Alternatively, both of the stations may be mobile. One of the stations could be a satellite or the like. Embodiments of the present invention may be used in two way radio communication.

What is claimed is:

1. A modulator for modulating input data, said modulator comprising:

an input for receiving data to be modulated;

a plurality of memory regions arranged to contain information relating to a modulation method to be carried out by said modulator, at least one of said memory regions providing time independent modulation values and at least one of said memory regions providing time dependent modulation values, the values provided by said memory regions being dependent on the data received via said input;

wherein each memory region may be used in a plurality of modulation methods;

processing means for providing a modulating signal based on the values provided by said memory regions; and an output for outputting modulated data, wherein the output of the modulator is defined by the following equation:

$$(\int A'(t, \text{data\_amp}) dt + Ao(\text{data\_amp})) \cos(\omega c\ t + \int \Phi'(t, \text{data\_ph}) dt + \Phi o(\text{data\_ph})) \quad (1)$$

where:

A' (t,data_amp) is the output of the memory region providing time dependent amplitude modulation values;

Ao (data_amp) is the output of the memory region providing time independent amplitude modulation values;

Φ' (t,data_ph) is the output of the memory region providing time dependent phase modulation values;

Φo (data_ph) is the output of the memory region providing time independent phase modulation values; and ωc is the frequency used to carry the modulation signal.

2. A modulator as claimed in claim 1, wherein said memory regions comprise a memory region arranged to provide time independent phase modulation values and a memory region arranged to provide time dependent phase modulation values.

3. A modulator as claimed in claim 1, wherein said memory regions comprise a memory region arranged to provide time dependent amplitude modulation values and a memory region arranged to provide time independent amplitude modulation values.

4. A modulator for modulating input data, the modulator comprising:

an input for receiving data to be modulated;

a plurality of memory regions arranged to contain information relating to a modulation method to be carried out by the modulator, at least one of the memory regions providing amplitude modulation values and at least one of the memory regions providing phase modulation values, the values provided by the memory regions being dependent on the data received via the input;

wherein each memory region may be used in a plurality of modulation methods; and processing means for providing a modulation signal based on the values provided by the memory region, wherein the output of the modulator is defined by the following equation:

$$(\int A'(t,\text{data\_amp})dt + Ao(\text{data\_amp}))\cos(\omega c\ t + \int \Phi'(t,\text{data\_ph})dt + \Phi o(\text{data\_ph})) \quad (1)$$

where:

A' (t,data_amp) is the output of the memory region providing time dependent amplitude modulation values;

Ao (data_amp) is the output of the memory region providing time independent amplitude modulation values;

Φ' (t,data_ph) is the output of the memory region providing time dependent phase modulation values;

Φo (data_ph) is the output of the memory region providing time independent phase modulation values; and ωc is the frequency used to carry the modulation signal.

5. A modulator as claimed in claim 4, wherein said at least one of said memory regions providing amplitude modulation values provide at least one of the following values:

time independent amplitude modulation values and time dependent amplitude modulation values.

6. A modulator as claimed in claim 2, wherein the outputs of said memory regions providing the time independent and time dependent modulation values are connected to a direct digital synthesizer which sums together the outputs of said memory regions.

7. A modulator as claimed in any of claim 2, wherein the output of the or each of said memory regions providing time dependent modulation values is coupled to respective integrator means of said processing means.

8. A modulator as claimed in claim 1 wherein the or each memory region arranged to provide time dependent modulation values is arranged to receive a counter signal.

9. A modulator as claimed in claim 1, wherein said modulator is arranged to be capable of supporting a plurality of different modulation methods, said memory regions arranged to contain information relating to the selected modulation method.

10. A modulator as claimed in claim 9, wherein said modulator is provided with a plurality of memory regions wherein in dependence on the selected modulation method, only some of those plurality of memory regions are used.

11. A modulator as claimed in claim 1, wherein said memory regions are arranged to store values relating to a selected modulation method whereby each memory region provides a look-up table.

12. A modulator as claimed in claim 1, wherein said memory regions are arranged to store respective programs from which said values are generated.

13. A modulator as claimed claim 1, wherein data control means are provided, said data control means being arranged to control to which of said memory regions said input data is applied.

14. A modulator as claimed in claim 1, wherein register means are provided for said memory regions, said register means being arranged to store a predetermined amount of said input data.

15. A modulator as claimed in claim 14, wherein each value provided by said memory regions is dependent on at least some of said predetermined amount of said input data stored in said register means.

16. A modulator as claimed in claim 1, wherein said processing means comprises means for combining the outputs from the plurality of memory regions.

17. A modulator as claimed in claim 16, wherein said combining means comprise adding means and/or multiplying means.

18. A modulator as claimed in claim 1 wherein a carrier frequency is combined with the output from at least one of said memory regions.

19. A modulator as claimed in claim 1, wherein said modulator is arranged to be capable of supporting a plurality of different modulation methods, said memory regions arranged to contain information relating to the selected modulation method, wherein a controller is arranged to provide the information in the memory regions in accordance with the selected modulation method.

20. A modulator as claimed in claim 1, wherein said modulator is arranged to be capable of supporting a plurality of different modulation methods, said memory regions arranged to contain information relating to the selected modulation method, wherein register means are provided for said memory regions, said register means being able to store a predetermined amount of said input data, wherein a controller is arranged to provide information to said data control means indicating to which of said memory regions said input data is to be applied.

21. A modulator as claimed in claim 1, wherein the or each memory region arranged to provide time dependent modulation values is arranged to receive a counter signal, wherein a controller is arranged to provide information to said data control means indicating to which of said memory regions said input data is to be applied.

22. A modulator as claimed in claim 19, wherein said controller has an external input for receiving information relating to the selected modulation method.

23. A station of a cellular telecommunications network incorporating the modulator as claimed in claim 1.

24. A method of modulating input data incorporating the modulator according to claim 1 comprising:

receiving input data to be modulated;

providing a plurality of memory regions arranged to contain time independent modulation information and time dependent modulation information;

outputting time dependent and time independent modulation values from said respective memory regions in dependence on the received input data;
wherein each memory region may be used in a plurality of modulation methods; and processing said time dependent modulation values and said time independent modulation values to provide a modulation signal.

25. A method of modulating input data incorporating the modulator according to claim 1 comprising:

receiving input data to be modulated;

providing a plurality of memory regions arranged to contain phase modulation information and amplitude modulation information;

outputting phase modulation and amplitude modulation values from said respective memory regions in dependence on the received input data;
wherein each memory region may be used in a plurality of modulation methods; and processing said phase modulation values and said amplitude modulation values to provide a modulation signal.

26. A modulator for modulating input data, said modulator comprising:

an input for receiving data to be modulated;

a plurality of memory regions arranged to contain information relating to a modulation method to be carried out by said modulator, at least one of said memory regions providing a first type of modulation values and at least one of said memory regions providing a second type of modulation values, the values provided by said memory regions being dependent on the data received via said input;
wherein said memory region may be used in a plurality of modulation methods; and processing means for providing a modulating signal based on the values provided by said memory regions, wherein the output of the modulator is defined by the following equation:

$$(\int A'(t, \text{data\_amp})dt + Ao(\text{data\_amp}))\cos(\omega c\ t + \int \Phi'(t, \text{data\_ph})dt + \Phi o(\text{data\_ph})) \quad (1)$$

where:

$A'$ (t,data_amp) is the output of the memory region providing time dependent amplitude modulation values;

$Ao$ (data_amp) is the output of the memory region providing time independent amplitude modulation values;

$\Phi'$ (t,data_ph) is the output of the memory region providing time dependent phase modulation values;

$\Phi o$ (data_ph) is the output of the memory region providing time independent phase modulation values; and $\omega c$ is the frequency used to carry the modulation signal.

27. A method of modulating input data incorporating the modulator according to claim 1 comprising:

receiving input data to be modulated;

providing a plurality of memory regions arranged to contain a first type of modulation information and a second type of modulation information;

outputting first type and second type modulation values from said respective memory regions in dependence on the received input data;
wherein each memory region may be used in a plurality of modulation methods; and processing said first type of modulation values and said second type of modulation values to provide a modulation signal.

* * * * *